United States Patent
Ishikawa

[11] Patent Number: 5,978,606
[45] Date of Patent: Nov. 2, 1999

[54] PHOTOMETRIC DEVICE AND A LIGHT RECEIVING SECTION FOR USE IN A PHOTOMETRIC DEVICE

[75] Inventor: Norio Ishikawa, Osaka, Japan

[73] Assignee: Minolta Co., Ltd., Osaka, Japan

[21] Appl. No.: 09/033,999

[22] Filed: Mar. 3, 1998

[30] Foreign Application Priority Data

Mar. 5, 1997 [JP] Japan .................................. 9-050408

[51] Int. Cl.⁶ .................................................. G03B 7/094
[52] U.S. Cl. ........................................ 396/275; 396/225
[58] Field of Search ................................ 396/225, 268, 396/275

[56] References Cited

U.S. PATENT DOCUMENTS

| | | | |
|---|---|---|---|
| 3,452,658 | 7/1969 | Krull et al. | 396/275 |
| 4,041,308 | 8/1977 | Fujita | 396/275 |
| 4,335,943 | 6/1982 | Numata | 396/225 |
| 4,989,982 | 2/1991 | Osaki et al. | |
| 5,172,146 | 12/1992 | Wooldridge | 396/209 |
| 5,406,067 | 4/1995 | Keller | |

FOREIGN PATENT DOCUMENTS 2245705 1/1992 United Kingdom .

Primary Examiner—Russell Adams
Attorney, Agent, or Firm—Burns, Doane, Swecker & Mathis, LLP

[57] ABSTRACT

A photometric device is provided with a light receiving section including a diffusing member which has a spherical diffusing surface to diffuse incident light to provide a predetermined oblique incidence angle characteristics, and a plurality of light receiving units which each receive light diffused by the diffusing member, each of the light receiving units including a light receiving surface that is a symmetrical form with respect to an optical axis of the light receiving section. The oblique incidence angle characteristics in the latitudinal direction can be made regardless of or independently of an oblique incidence angle characteristics in the longitudinal direction.

24 Claims, 12 Drawing Sheets

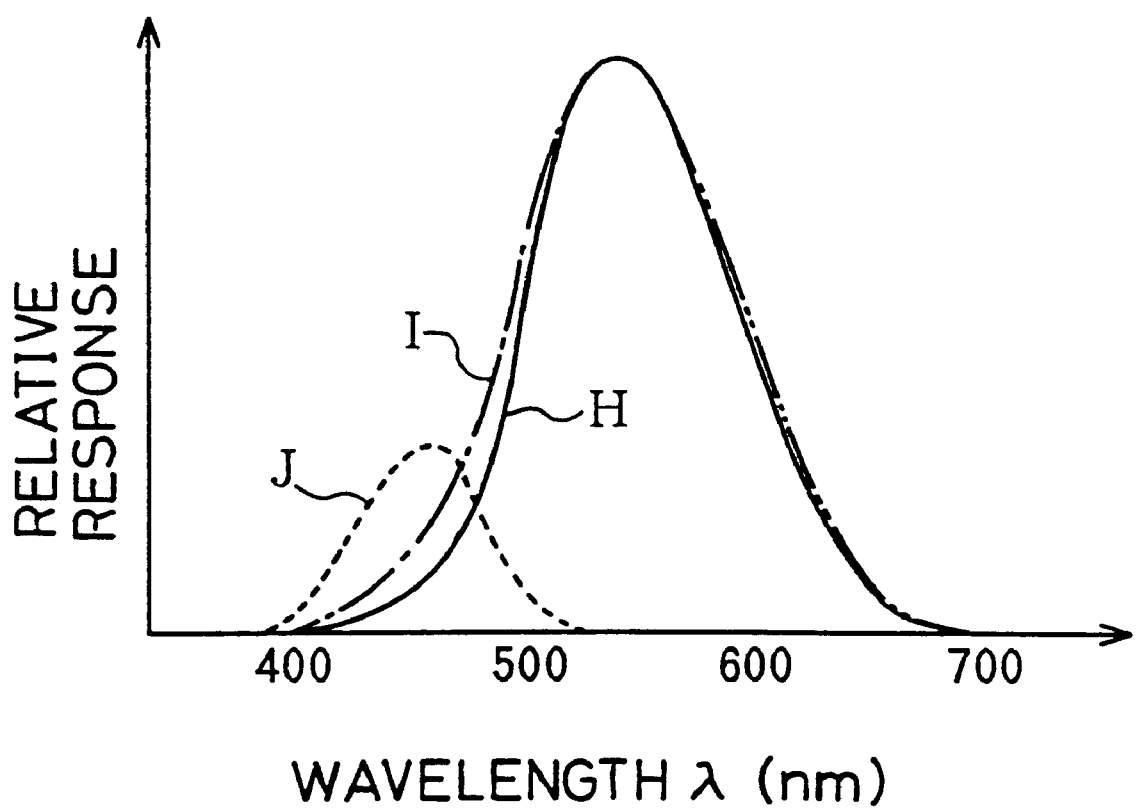

PHOTOMETRIC DEVICE AND A LIGHT RECEIVING SECTION FOR USE IN A PHOTOMETRIC DEVICE

This application is based on application No. 9-50408 filed in Japan, the content of which is hereby incorporated by reference.

BACKGROUND OF THE INVENTION

This invention relates to a photometric device such as colormeter for photography, illuminancemeter, and usual colormeter, and also to a light receiving section provided in a photometric device.

Conventionally, photometric devices such as colormeter for photography, illuminancemeter and usual colormeter have been known. Such a photometric device is required to have a characteristics according to its application. Particularly, it is necessary to design the photometric device such that it has a specified oblique incidence angle characteristics which is a common characteristics among photometric devices.

This oblique incidence angle characteristics is described with reference to FIG. 9. A photometric device 111 is provided with a light receiving section 112, whose center O is so arranged as to coincide with Z-axis of X, Y, Z-orthogonal coordinate systems. On this center O is incident an incident light L as a measurement object. Assuming that an angle formed by the incident light L and the Z-axis is a latitude and an angle formed by the incident light L and an XZ-plane on an XY-plane is a longitude, an oblique incidence angle is expressed by an incidence angle $\alpha$ in the longitudinal direction and an incidence angle $\beta$ in the latitudinal direction (the incidence angle $\alpha$ is an angle formed between the incident light L and the Z-axis and the incidence angle $\beta$ is an angle formed between a plane including the incident light L and the Z-axis and the XZ-plane). The oblique incidence angle characteristics refers to an output dependency of the light receiving section on the incidence angles $\alpha$ and $\beta$.

For example, in the case that the photometric device is an illuminancemeter, the oblique incidence angle characteristics in relation to the incidence angle $\alpha$ is required to satisfy the so-called cosine characteristics standardized by the Japanese Industrial Standards (JIS C 1609) or the like. Further, the oblique incidence angle characteristics in relation to the incidence angle $\beta$ needs to be designed to eliminate an angular dependency lest measurement vales should vary depending upon how the apparatus is installed (orientation of the light receiving section).

Of course, in the colormeter for photography and usual colormeter other than the illuminancemeter, the oblique incidence angle characteristics in relation to the incidence angle $\beta$ also need to be similarly designed to eliminate the angular dependency.

In order to attain the oblique incidence angle characteristics in relation to the incidence angle $\alpha$ as above, a milky acrylic plate or the like diffusing member is placed on the front surface of the light receiving section to sufficiently diffuse the incident light. Further, the diffusing member is shaped to have a semispherical surface and/or the shape of a diffusing member holder around a window for the light receiving section 12 is devised.

Further, as a photometric device with a single light receiving section having a plurality of light receiving elements therein, a colormeter for photography has been, for example, known.

In the colormeter for photography, it is necessary to arrange three light receiving elements (light receiving elements having sensitivities in three wavelength ranges of blue, green and red). FIGS. 10A and 10B show a construction of a colormeter for photography, wherein FIG. 10A is a front view and FIG. 10B is a section taken along the Y-axis. In this colormeter 111, light receiving elements 113, 114, 115 having sensitivities to the respective wavelength ranges of red, green and blue are circumferentially arranged about the center O of the light receiving section 112. FIG. 10A shows a state where a diffusing member 116 of the light receiving section 112 is removed. The diffusing member is a planar member as shown in FIG. 10B.

If all these light receiving elements can be arranged in the center of the light receiving section, they are symmetrical with respect to the optical axis of the light receiving section 112 for a reason described later. Even if the diffusing member placed on the front surfaces of the light receiving elements were spherical, the oblique incidence angle dependency in the longitudinal direction could be, in principle, eliminated. However, since it is, in reality, physically difficult, the light receiving elements have to be circumferentially arranged about the center O of the light receiving section. Accordingly, the diffusing member is not allowed to have a curved surface, i.e., it has a planar surface.

In other words, the diffusing member has to have a planar surface so as to eliminate the oblique incidence angle dependency in the longitudinal direction even for the light receiving element arranged in a position displaced from the center O. As a result, the oblique incidence angle characteristics in the longitudinal direction is automatically determined by the material and thickness of the diffusing member.

Next, the illuminancemeter is described. The spectral sensitivity of the light receiving section of the illuminancemeter is required to agree with a relative luminous sensitivity characteristics $V(\lambda)$ of the CIE (Commission Internationale de l'Eclairage) standard observer. In conventional illuminancemeters, a filter method has been adopted according to which the spectral sensitivity of the light receiving section is made to maximally approximate to the relative luminous sensitivity characteristics $V(\lambda)$ by combining light receiving elements such as silicone photosensors with a color glass filter, interference filter, film filter (gelatin filter or acetate filter) or like filter.

However, the aforementioned filter method has a problem that, if an attempt is made to maximally approximate the spectral sensitivity of the light receiving section to $V(\lambda)$, the number of filters increases and the amount of light reaching the light receiving elements is reduced. If the number of the filters are reduced in order to increase the light amount, a degree of approximation to $V(\lambda)$ is disadvantageously degraded Further, even if there are variations in the respective characteristics of the light receiving elements, there is no problem if variation in the total spectral characteristics by combination of the filters and the light receiving elements lies within a permissible range. However, a strict administering is necessary so that the respective parts lie within such permissible ranges.

In order to overcome these problems, the following technique has been used in the prior art. Specifically, the light receiving section is constructed by combining a plurality of light receiving elements and filters having mutually different spectral transmittance characteristics, and the outputs of the light receiving elements are increased or decreased later by multiplying weight factors to attain a desired spectral sensitivity. Such a technique for synthesizing the desired spectral sensitivity using a plurality of light receiving elements is well-known not only in the illuminancemeter art but also in the art which seeks to attain a desired spectral sensitivity. For example, a colormeter adopting a three element method, taking advantage of a property that, out of three spectral sensitivities of the CIE spectral tristimulus values $x(\lambda)$, $y(\lambda)$, $z(\lambda)$, the shape of the short-wavelength side one of two concave curves of sensitivity in a visible region is analogous to that of $z(\lambda)$, equivalently calculates a total output of $x(\lambda)$ by multiplying the output of the light receiving element of $z(\lambda)$ by a specific factor and adding this multiplied output to the output of the light receiving element having a sensitivity of the long wavelength side of $x(\lambda)$. Further, in order to improve the accuracy of the spectral sensitivity characteristics of a colormeter, a proposal has been made to add and/or subtract the outputs of the three spectral stimulus values to and/or from each other (Japanese Unexamined Patent Publication No. 2(HEI)-45718). Another proposal has also been made to apply this concept to the standard relative luminous efficiency (Japanese Unexamined Patent Publication No. 7(HEI)-318423).

In the illuminancemeter of the spectral sensitivity synthesizing type using a plurality of light receiving elements as well, the problem arises that it is physically difficult to arrange all light receiving elements about the center O, similar to the aforementioned colormeter for photography.

In the aforementioned colormeter for photography, the oblique incidence angle characteristics in the longitudinal direction is automatically determined by the material and thickness of the diffusing member since the planar diffusing member is used in the light receiving window. Accordingly, the characteristics which should originally be inherent cannot be attained.

Specifically, the colormeter for photography is a device for analyzing the illumination condition of the same object in the same photographic scene (illumination condition) as a general incident light type exposure meter for photography. Accordingly, the oblique incidence angle characteristics of the both should originally agree with each other. However, the oblique incidence angle characteristics of the conventional colormeter for photography and that of the incident light type exposure meter could not agree with each other as described in detail below.

Generally in the incident light type exposure meter for photography, a light receiving sphere as a diffusing member having a semispherical surface is mounted on the light receiving section in the case that a three-dimensional object such as a person is photographed in an actual photographic scene. A measurement is performed by setting the light receiving section such that it faces a lens of a camera from the position of the object.

The oblique incidence angle characteristics in the latitudinal direction α when the light receiving sphere is mounted on the light receiving section of the incident light type exposure meter is so designed as to display an oblique incidence angle characteristics of the so-called cardioid shape as shown in FIG. 12. This characteristics considers lights which influence the photographing such as light La propagating toward a camera 201 from a side surface of an object 200 and light Lb propagating toward the camera 201 from a position obliquely behind the object 200.

The incident light type exposure meter and the colormeter for photography are adapted to measure and analyze the amount of light and the quality of illumination, receptively, in the same photographic scene (illumination condition). Accordingly, the oblique incidence angle characteristics should originally agree with each other. Specifically, in the colormeter for photography as well, light illuminating the object should be collectively measured in an actual photographic scene, using the light receiving sphere. However, in this colormeter, a planar diffusing member as a diffusing member has to be used for the following reason.

Specifically, the oblique incidence angle characteristics in the latitudinal direction of the colormeter for photography is automatically determined by the characteristics of the planar diffusing member, hence the oblique incidence angle in the latitudinal direction of "cardioid shape" as in the usual exposure meter cannot be realized. In other words, the oblique incidence angle characteristics of the conventional colormeter for photography is narrower than that of the general incident light type exposure meter and, thus, the illumination light rays from the lateral side of the object and from the obliquely behind of the object are evaluated with low degrees. Conversely, if a diffusing member having a spherical surface is used to realize the oblique incidence angle characteristics of "cardioid shape", balance in the incident light amount on the respective light receiving elements of red, green and blue is lost depending on the incident direction in the longitudinal direction, thereby making a deviation of analysis value larger.

FIG. 11 shows an example of oblique incidence angle characteristics of a light receiving element arranged outside the optical axis, for example, of the green light receiving element 114 in FIG. 10, in the longitudinal direction β with respect to oblique incident light when the diffusing member has a spherical surface. Ideally, the oblique incidence angle characteristics should be a circular characteristics about an origin of the coordinate systems where sensitivity is constant independently of the longitude as characteristics N shown by the broken line in FIG. 11. However, in reality, the characteristics is displaced with respect to the origin like characteristics M shown by the solid line in FIG. 11 due to the angular dependency in the longitudinal direction β. An effort is being given to improve a degree of diffusion by devising the characteristics of the diffusing member arranged on the front surface of the light receiving elements so that the oblique incident light can also be uniformly incident on the respective light receiving elements. However, if the degree of diffusion is increased to the extent that the oblique incidence angle dependency in the longitudinal direction becomes negligible, the level of amount of light incident on the light receiving elements is reduced. Thus, the oblique incidence angle dependency in the longitudinal direction cannot completely be eliminated and the elimination of this dependency should, at present, be compromised at a certain degree.

SUMMARY OF THE INVENTION

It is an object of the present invention to provide a photometric device and a light receiving section for use in a photometric device which have overcome the problems residing in the prior art.

According to an aspect of the present invention, a light receiving section for use in a photometric device, the light receiving section comprises: a diffusing member which has a spherical diffusing surface to diffuse incident light to provide a predetermined oblique incidence angle characteristics; and a plurality of light receiving units which each receive light diffused by the diffusing member, each of the light receiving units including a light receiving surface that is a symmetrical form with respect to an optical axis of the light receiving section.

According to another aspect of the present invention, a photometric device comprises: a light receiving section including: a diffusing member which has a spherical diffusing surface to diffuse incident light to provide a predetermined oblique incidence angle characteristics; and a plurality of light receiving units which each receive light diffused by the diffusing member, each of the light receiving units including a light receiving surface that is a symmetrical form with respect to an optical axis of the light receiving section; a calculator which calculates a measurement value based on respective outputs of the plurality of light receiving units; and an output section which outputs the measurement value calculated by the calculator.

According to another aspect of the present invention, a colormeter for photography, comprises: a light receiving section including: a diffusing member which has a spherical diffusing surface to diffuse incident light to provide a predetermined oblique incidence angle characteristics; and three light receiving units which are sensitive to a blue wavelength range, a green wavelength range, and a red wavelength range, respectively, and each receive light diffused by the diffusing member, and each include two light receiving elements arranged symmetrically to each other with respect to the optical axis of the light receiving section; a calculator which calculates a component ratio of blue, green, and red wavelength ranges based on a combined output of the two light receiving elements of each of the three light receiving units; and a display section which displays a measurement result based on the component ratio calculated by the calculator.

According to another aspect of the present invention, a colormeter for photography, comprises: a light receiving section including: a diffusing member which has a spherical diffusing surface to diffuse incident light to provide a predetermined oblique incidence angle characteristics; and three light receiving units which are sensitive to a blue wavelength range, a green wavelength range, and a red wavelength range, respectively, and each receive light diffused by the diffusing member, and each include a light receiving surface that is a form of a circle having a center of an optical axis of the light receiving section; a calculator which calculates a component ratio of blue, green, and red wavelength ranges based on respective outputs of the three light receiving units; and a display section which displays a measurement result based on a component ratio calculated by the calculator.

According to another aspect of the present invention, an illuminancemeter comprises: a light receiving section including: a diffusing member which has a spherical diffusing surface to diffuse incident light to provide a predetermined oblique incidence angle characteristics; and a first light receiving unit and a second light receiving unit which each receive light diffused by the diffusing member, the first light receiving unit including two light receiving elements arranged symmetrically to each other with respect to an optical axis of the light receiving section and having a spectral sensitivity characteristics near to the spectral sensitivity characteristics of the CIE standard observer, and the second light receiving unit including two light receiving elements arranged symmetrically to each other with respect to the optical axis of the light receiving section and having a spectral sensitivity characteristics near to a difference between the spectral sensitivity characteristics of the first light receiving unit and the spectral sensitivity characteristics of the CIE standard observer; a calculator which corrects a combined output of the two light receiving elements of the first light receiving unit by adding or subtracting a combined output of the two light receiving elements of the second light receiving unit to or from the combined output of the two light receiving elements of the first light receiving unit, and calculates an illuminance based on a corrected output; and a display section which displays a calculated illuminance.

These and other objects, features and advantages of the present invention will become more apparent upon a reading of the following detailed description and accompanying drawings.

BRIEF DESCRIPTION OF THE DRAWINGS

FIG. 8 is a graph showing a degree of relative response to wavelengths;

DETAILED DESCRIPTION OF THE PREFERRED EMBODIMENTS OF THE INVENTION

Figure 1:
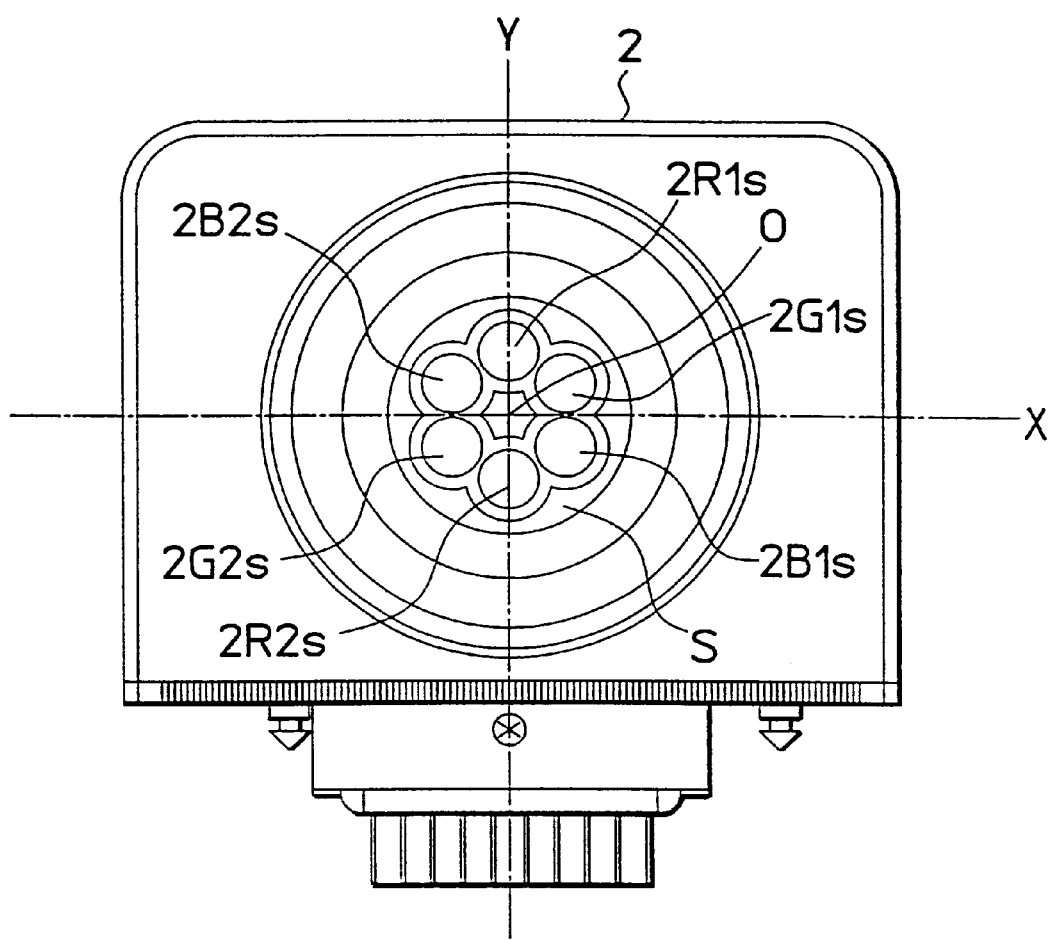
FIG. 1 is a front view of a light receiving section according to a first embodiment of the invention.

A photometric device to which a light receiving section is provided according to a first embodiment of the invention will be described with reference to FIG. 1 which is a front view of the light receiving section and FIG. 2 which is a circuit construction diagram. It should be noted that a diffusing member is removed from FIG. 1 in order to facilitate the description.

A colormeter for photography 1 as a photometric device according to this embodiment is provided with a light receiving section 2 for receiving light components in specified wavelength ranges from light illuminating an object. Specifically, this light receiving section 2 includes a red light receiving element unit 2R for receiving light components in a red wavelength range from the light illuminating the object and obtaining electrical signals corresponding to light amounts of the received light components, a green light receiving element unit 2G for receiving light components in a green wavelength range from the light illuminating the object and obtaining electrical signals corresponding to light amounts of the received light components, and a blue light receiving element unit 2B for receiving light components in a blue wavelength range from the light illuminating the object and obtaining electrical signals corresponding to light amounts of the received light components. Further, an amplifying unit 3 logarithmically amplifies the signals including the light components in the wavelength ranges of the respective colors obtained in the light receiving section 2; a calculator 4 calculates a ratio of the light components in the wavelength ranges of the respective colors which are amplified in the amplifying unit 3; and a display device 5 displays an analysis result using the component ratio calculated in the calculator 4.

Figure 9:
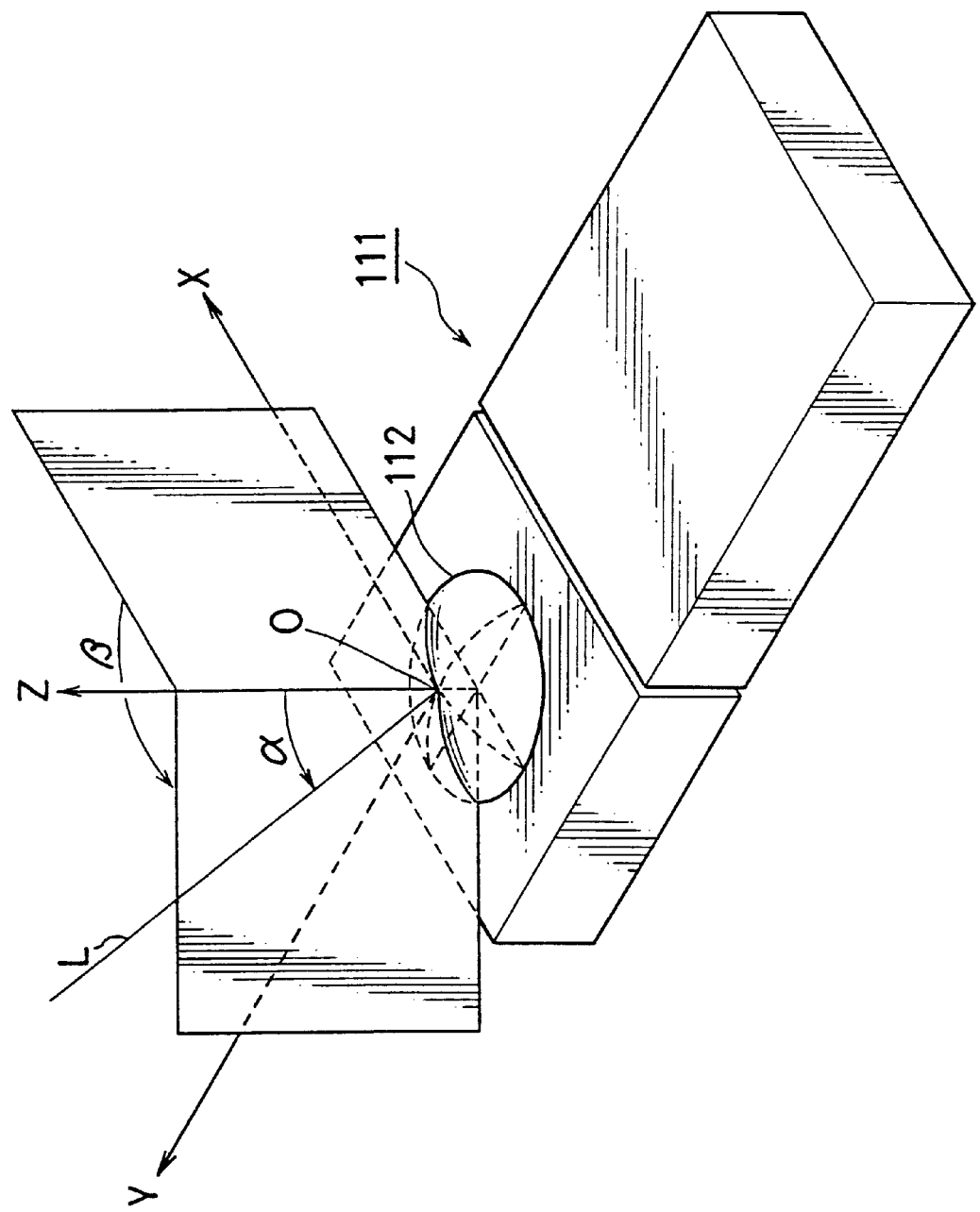
FIG. 9 is a diagram showing an oblique incidence angle and oblique incidence angle characteristics.
Figure 10A:
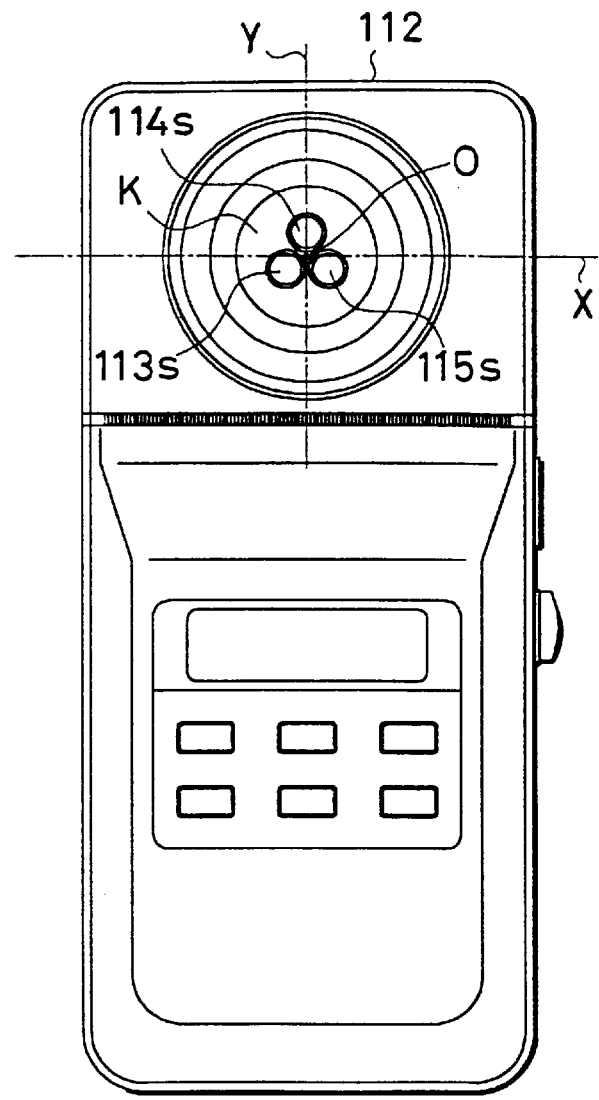
FIG. 10A is a front view of a conventional colormeter for photography.
Figure 10B:
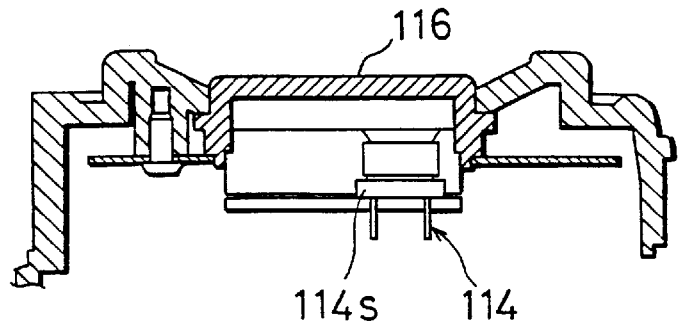
FIG. 10B is a sectional view of a light receiving section of the conventional colormeter.
Figure 11:
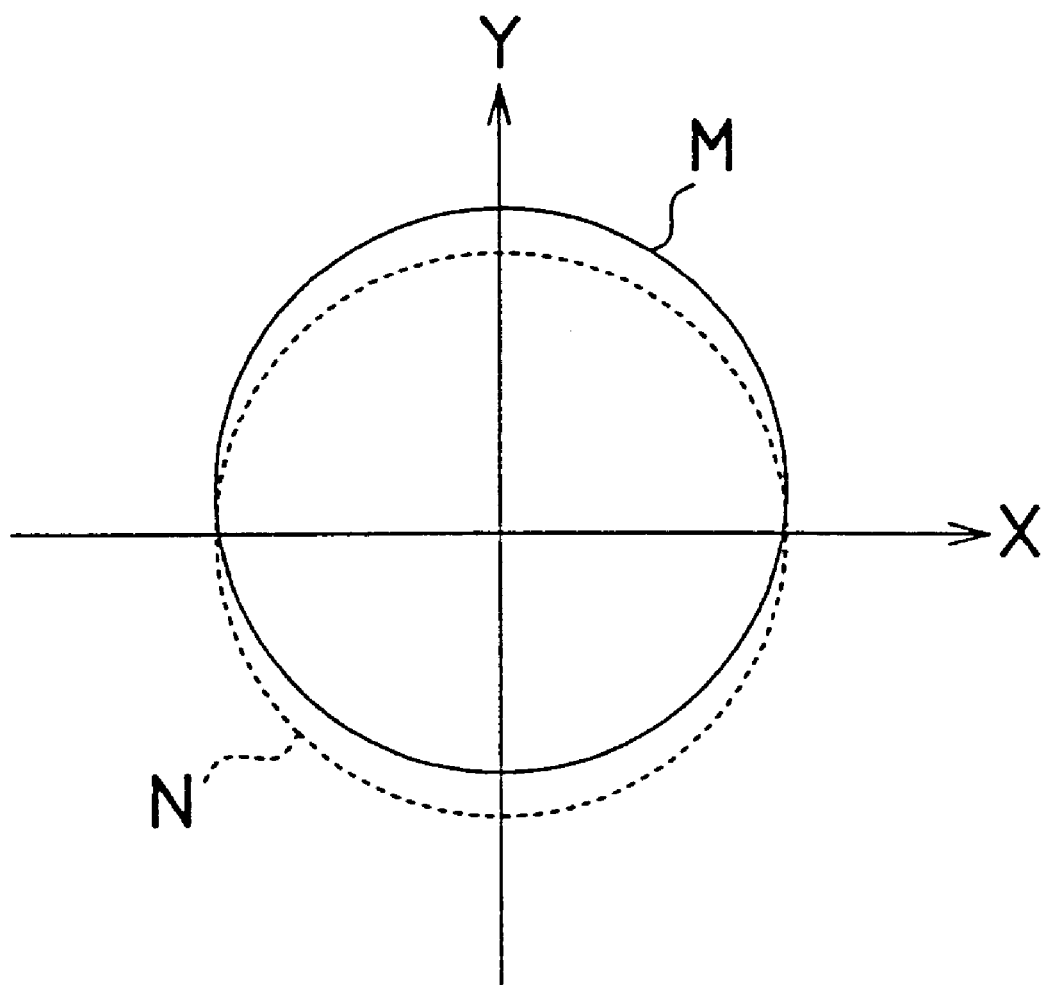
FIG. 11 is a graph showing a light receiving angle characteristics of a green light receiving element with respect to the longitudinal direction β in the conventional colorimeter.
Figure 12:
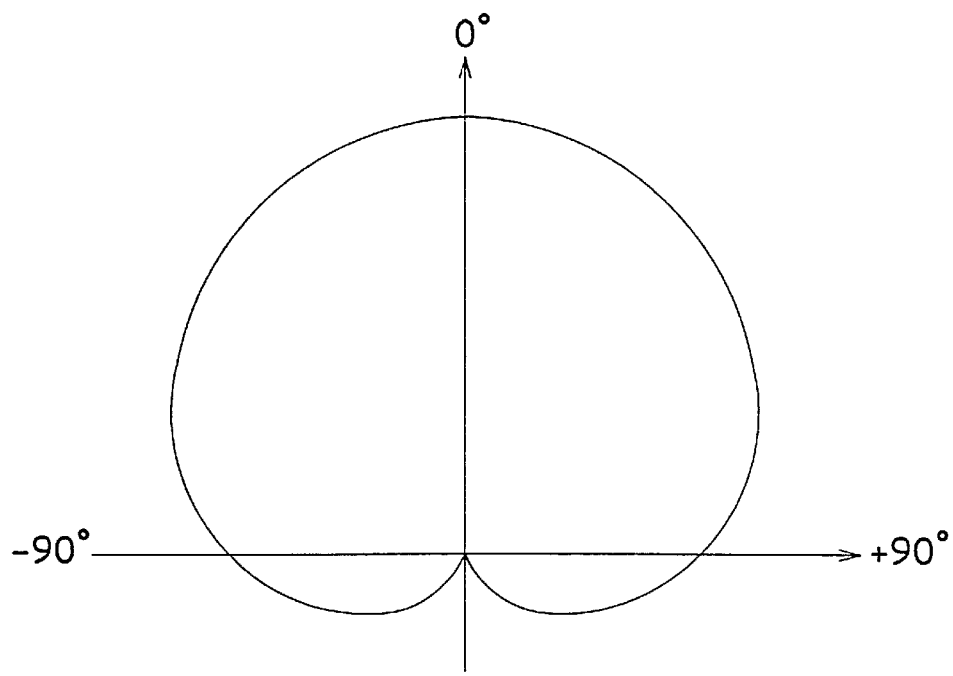
FIG. 12 is a graph showing an oblique incidence angle characteristics in the latitudinal direction α when a light receiving sphere is mounted on a light receiving section of an incident light type exposure meter.
Figure 13:
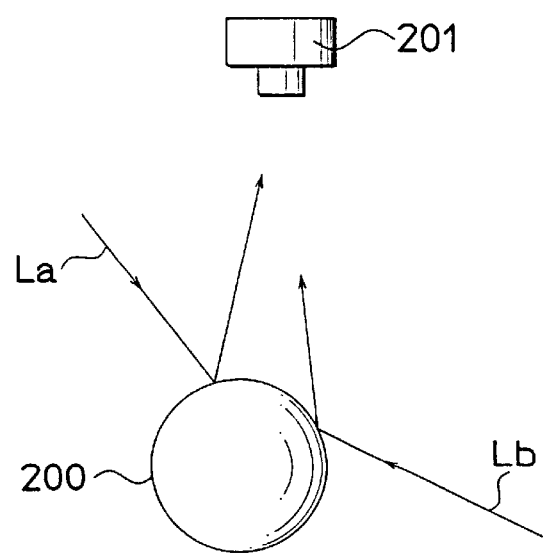
FIG. 13 is a diagram showing influential light rays when a three-dimensional object is photographed.

The light receiving section 2 is, as shown in FIG. 1, provided at its bottom with a connection terminal connected with the respective output terminals of the red, green and blue light receiving element units 2R, 2G, 2B and is detachably mountable on an unillustrated photometric device main body (see FIG. 9 for a state after the mounting).

The red light receiving element unit 2R includes red light receiving elements 2R1, 2R2 for receiving light components in the red wavelength range via light receiving surfaces 2R1s, 2R2s formed with filters for causing the light components in the red wavelength range to transmit and obtaining electrical signals corresponding to the light amounts of received light components in the red wavelength range. The light receiving surfaces 2R1s, 2R2s of the red light receiving elements 2R1, 2R2 are located on Y-axis within a surface S of the light receiving area of the light receiving section 2 as shown in FIG. 1 and in positions which are symmetrical with respect to an axis (optical axis) passing a center O. Likewise, the green light receiving element unit 2G includes green light receiving elements 2G1, 2G2 for receiving light components in the green wavelength range via light receiving surfaces 2G1s, 2G2s formed with filters for causing the light components in the green wavelength range to transmit and obtaining electrical signals corresponding to the light amounts of received light components in the green wavelength range. The light receiving surfaces 2G1s, 2G2s of the green light receiving elements 2G1, 2G2 are arranged in positions, within the surface S of the light receiving area of the light receiving section 2, which are symmetrical with respect to the axis passing the center O. Further, the blue light receiving element unit 2B includes green light receiving elements 2B1, 2B2 for receiving light components in the blue wavelength range via light receiving surfaces 2B1s, 2B2s formed with filters for causing the light components in the blue wavelength range to transmit and obtaining electrical signals corresponding to the light amounts of received light components in the blue wavelength range. The light receiving surfaces 2B1s, 2B2s of the blue light receiving elements 2B1, 2B2 are arranged in positions, within the surface S of the light receiving area of the light receiving section 2, which are symmetrical with respect to an axis passing the center O. These six light receiving elements have the same kind and the same shape as one another, and are arranged at intervals of 60° on a circle having a specified radius from the center O. For example, photodiodes are adopted as the respective elements.

Figure 2:
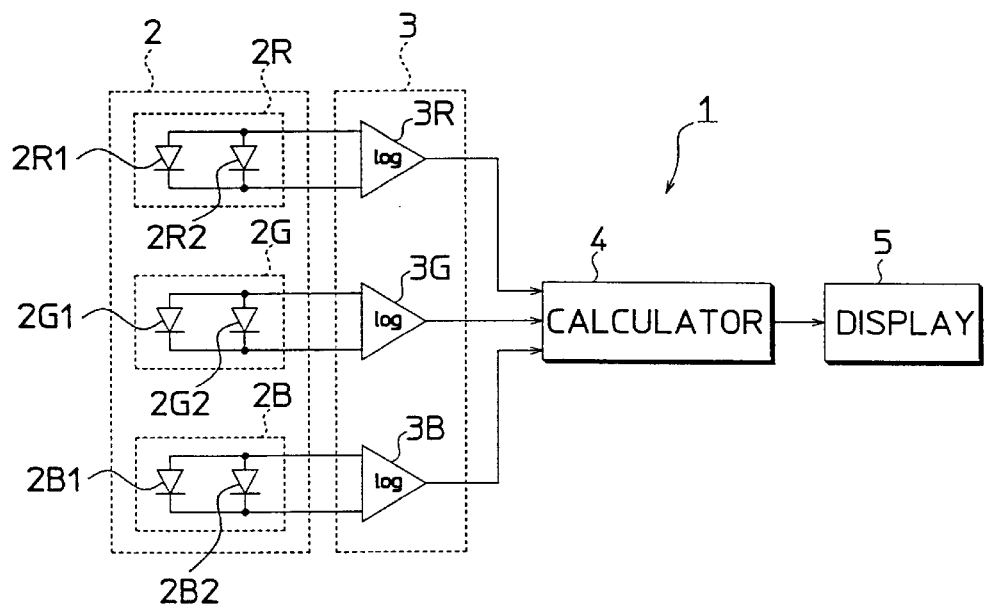
FIG. 2 is a diagram showing a circuit construction of a photometric device according to the first embodiment.

As shown in FIG. 2, the red light receiving elements 2R1, 2R2 have their cathode sides and anode sides connected with each other. Likewise, the green light receiving elements 2G1, 2G2 and the blue light receiving elements 2B1, 2B2 also have their cathode sides and anode sides connected with each other. Further, in this embodiment, a light receiving sphere having an unillustrated semispherical diffusion surface which causes the oblique incidence angle characteristics to have a cardioid shape is so mounted on the surface S of the light receiving section 2 as to cover the red, green and blue light receiving element units 2R, 2G and 2B (see 223 of FIG. 6B).

The amplifying unit 3 includes a logarithmic amplifier 3R for logarithmically amplifying the signals obtained by the red light receiving element unit 2R and including the light components in the red wavelength range, a logarithmic amplifier 3G for logarithmically amplifying the signals obtained by the green light receiving element unit 2G and including the light components in the green wavelength range, and a logarithmic amplifier 3B for logarithmically amplifying the signals obtained by the blue light receiving element unit 2B and including the light components in the blue wavelength range.

Next, an operation of the light receiving section 2 is described. The illumination light for the object to be analyzed for the light quality is split into light components in red, green and blue wavelength ranges by the filters of the red, green and blue light receiving element units 2R, 2G, 2B and then received by the light receiving surfaces of the red, green and blue light receiving element units 2R, 2G, 2B to be obtained as electrical signals.

Figure 3:
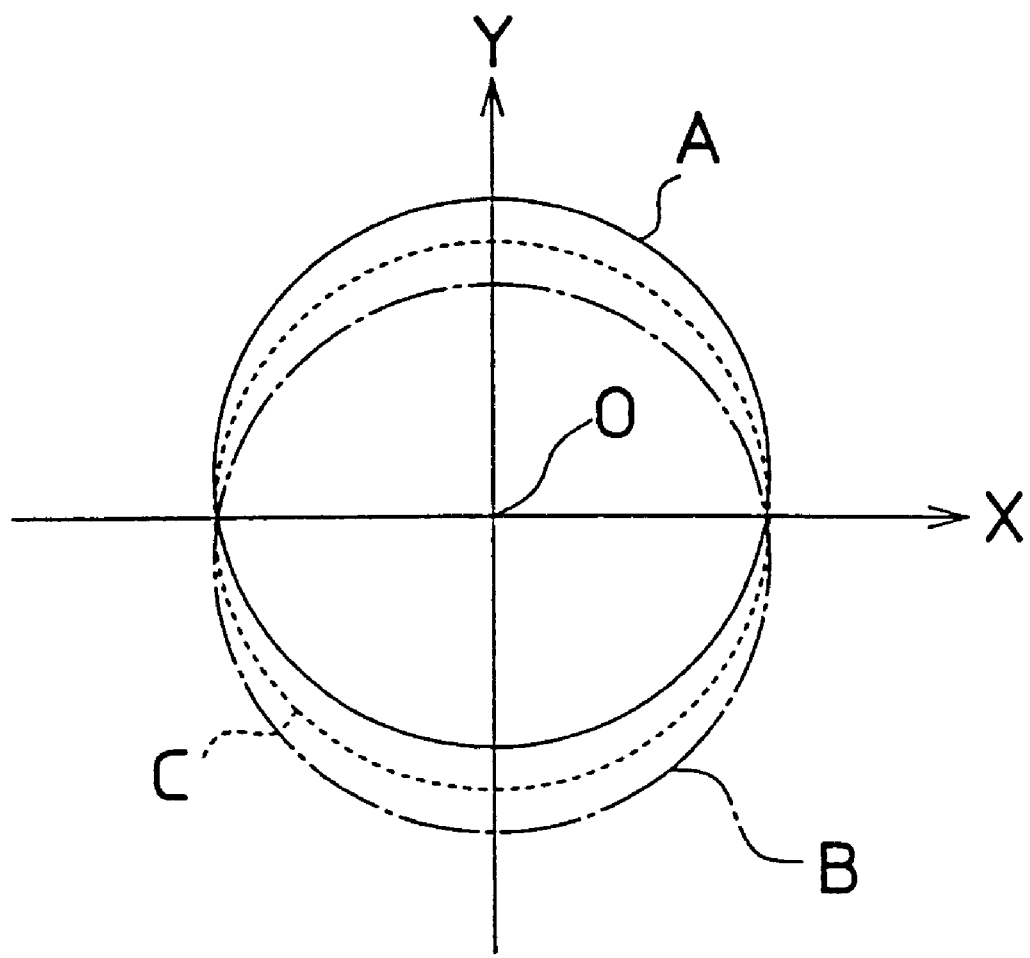
FIG. 3 is a graph showing oblique incidence angle characteristics of a red light receiving element unit.

FIG. 3 shows an oblique incidence angle characteristics of the red light receiving element unit 2R. As shown in FIG. 1, the red light receiving element 2R1 is not arranged on the center O, rather arranged in a position upwardly distanced from the center O only by a specified distance (d). The light receiving section 2 is mounted with the light receiving sphere. Accordingly, the output of the red light receiving element 2R1 displays an oblique incidence angle characteristics dependent on an incidence angle in the longitudinal direction β as in a circle A shown by the solid line in FIG. 3. Likewise, since the output of the other red light receiving element 2R2 is arranged in a position downwardly distanced from the center O by d, it displays an oblique incidence angle characteristics which is symmetrical about X-axis with respect to the oblique incidence angle characteristics of the red light receiving element 2R1 and is dependent on the incidence angle in the longitudinal direction β as in a circle B shown by the phantom line in FIG. 3. However, since the outputs of the red light receiving elements 2R1, 2R2 are fed to the amplifying unit 3 while being superimposed, the oblique incidence angle dependencies in the longitudinal direction β of the red light receiving elements 2R1, 2R2 act to cancel each other. As a result, an average value of the outputs of the red light receiving elements 2R1, 2R2 (i.e., ½ of the output of the red light receiving element unit 2R) does not depend on the incidence angle in the longitudinal direction β as in a circle C shown by the broken line in FIG. 3, i.e., displays a constant oblique incidence angle characteristics regardless of a variation in the incidence angle in the longitudinal direction β. Similarly, the outputs of the green and blue light receiving elements 2G, 2B display oblique incidence angle characteristics independent of the incidence angle in the longitudinal direction β.

The output signals of the red, green and blue light receiving element units 2R, 2G, 2B displaying the oblique input angle characteristics independent of the incidence angle in the longitudinal direction β are logarithmically amplified by the logarithmic amplifiers 3R, 3G and 3B. These logarithmically amplified signals are fed to the calculator 4, where the ratio of the light components in the wavelength ranges of the respective colors is calculated. Thereafter, the analysis result obtained by using the ratio of the light components in the wavelength ranges of the respective colors is displayed in the display device 5. Specifically, by the colormeter 1 for photography, the analysis result independent of the incidence angle in the longitudinal direction β is displayed in the display device 5. By adopting the light receiving section 2 in which the oblique incidence angle dependency in the longitudinal direction β is eliminated, the diffusing member having a spherical surface of a desired curvature can be used in the light receiving section 2 so as to design a desired oblique incidence angle characteristics in the latitudinal direction α, thereby increasing the degree of freedom of design.

Figure 4A:
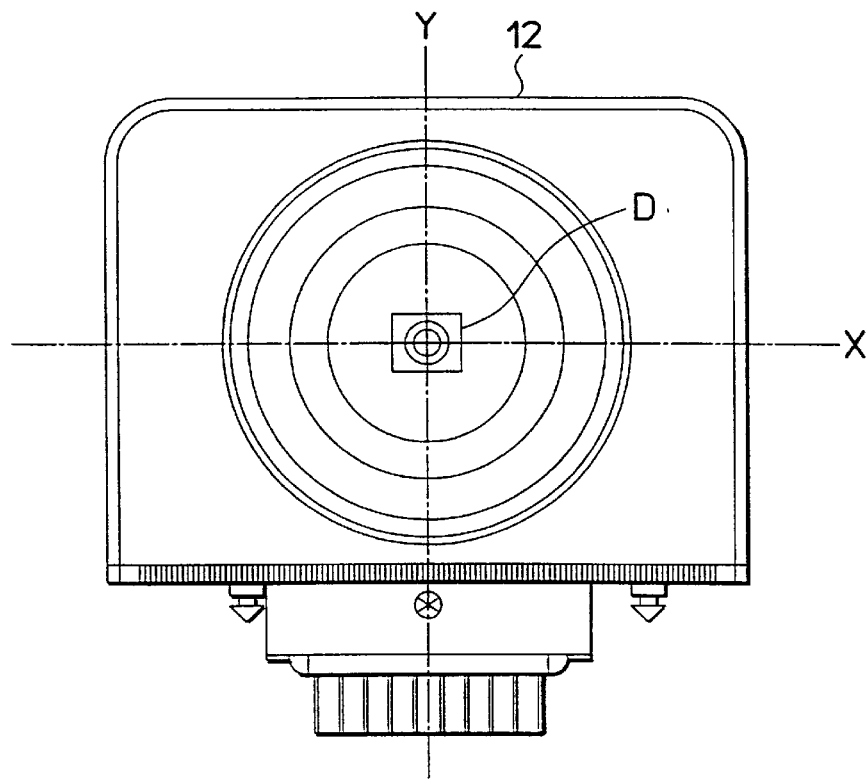
FIG. 4A is a front view of a light receiving section according to a second embodiment of the invention.
Figure 4B:
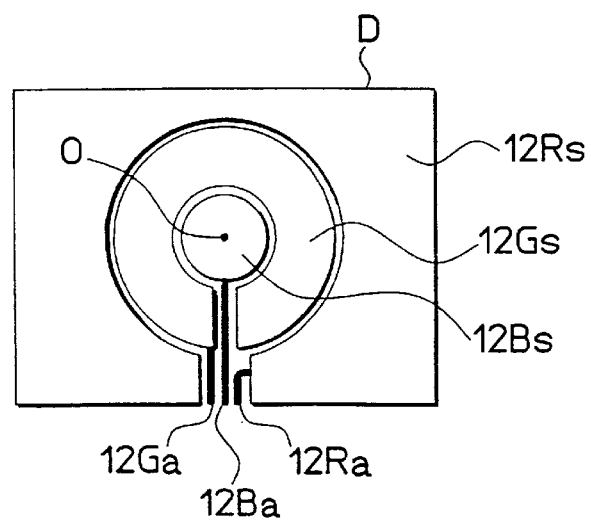
FIG. 4B is an enlarged view of a light receiving area of the light receiving section of FIG. 4A.
Figure 5:
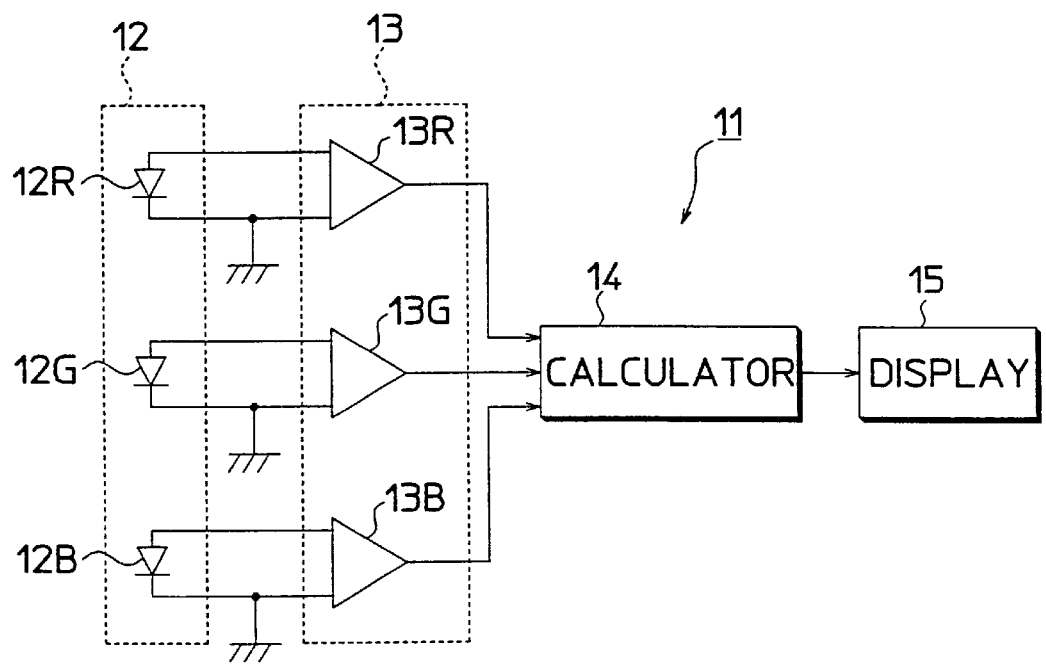
FIG. 5 is a diagram showing a circuit construction of a photometric device according to the second embodiment.

A photometric device adopting a light receiving section according to a second embodiment of the invention is described with reference to FIGS. 4 and 5. FIG. 4A is a front view of the light receiving section; FIG. 4B is an enlarged view of a light receiving area; and FIG. 5 is a circuit construction diagram of the photometric device.

A colormeter 11 for photography as a photometric device according to this embodiment is provided with a light receiving section 12 for receiving light components in specified wavelength ranges from a light illuminating an object. Specifically, this light receiving section 12 includes a red light receiving element 12R for receiving light components in a red wavelength range from the light illuminating the object and obtaining electrical signals corresponding to light amounts of the received light components, a green light receiving element 12G for receiving light components in a green wavelength range from the light illuminating the object and obtaining electrical signals corresponding to light amounts of the received light components, and a blue light receiving element 12B for receiving light components in a blue wavelength range from the light illuminating the object and obtaining electrical signals corresponding to light amounts of the received light components. Further, an amplifying unit 13 logarithmically amplifies the signals including the light components in the wavelength ranges of the respective colors obtained in the light receiving section 12; a calculator 14 calculates a ratio of the light components in the wavelength ranges of the respective colors which are amplified in the amplifying unit 13; and a display device 15 displays an analysis result using the component ratio calculated in the calculator 14.

The light receiving section 12 is provided at its bottom side with a connection terminal connected with the respective output terminals of the red, green and blue light receiving elements 12R, 12G, 12B as shown in FIG. 4A and is detachably mountable on an unillustrated photometric device main body (see FIG. 9 for a state after the mounting).

In FIG. 4B, the blue light receiving element 12B is provided with a circular light receiving surface 12Bs having a point O as a center and an anode side terminal (or a drawn line) 12Ba which is drawn downward from the bottom end of the light receiving element 12Bs. The surface 12Bs and the terminal 12Ba form a part of a light receiving area D. The green light receiving element 12G is provided with an annular light receiving surface 12Gs formed outside the light receiving surface 12Bs via an insulating portion and having the point O as a center, and an anode side terminal 12Ga which is drawn downward from the bottom end of the light receiving surface 12Gs. The surface 12Gs and the terminal 12Ga also form a part of the light receiving area D. The red light receiving element 12R is provided with a rectangularly annular light receiving surface 12Rs formed outside the light receiving surface 12Gs via an insulating portion and having a rectangular outer edge with the point O as a center, and an anode side terminal 12Ra which is drawn downward from substantially the center of the bottom end of the light receiving surface 12Rs. The surface 12Rs and the terminal 12Ra also form a part of the light receiving area D. It should be noted that the light receiving surface 12Ra may be a circularly annular with the point O as a center. In other words, it is sufficient that the respective light receiving surfaces are formed symmetrical with respect to the optical axis passing the center O. Further, the cathodes of the respective light receiving elements are common in the light receiving section 12.

Further, a light receiving sphere having an unillustrated semispherical diffusion surface which causes the oblique incidence angle characteristics to have a cardioid shape is so mounted on the light receiving section 2 as to cover the light receiving area D. The light receiving surfaces 12Rs, 12Gs, 12Bs may have the same area, respectively or normalization may be applied during the processing according to the area of each light receiving surface.

The amplifying unit 13 includes a logarithmic amplifier 13B for logarithmically amplifying the signals obtained by the blue light receiving element 12B and including the light components in the blue wavelength range, a logarithmic amplifier 13G for logarithmically amplifying the signals obtained by the green light receiving element 12G and including the light components in the green wavelength range, and a logarithmic amplifier 13R for logarithmically amplifying the signals obtained by the red light receiving element unit 12R and including the light components in the red wavelength range.

Next, an operation of the light receiving section 12 is described. The illumination light for the object to be analyzed for the light quality is split into light components in blue, green and red wavelength ranges by the filters of the blue, green and red light receiving element 12B, 12G, 12R and then received by the light receiving surfaces 12Bs, 12Gs, 12Rs of the blue, green and red light receiving element 12B, 12G, 12R to be obtained as electrical signals.

As shown in FIG. 4B, the output of the blue light receiving element 12B displays an oblique incidence angle characteristics independent of the incidence angle in the longitudinal direction β since the light receiving surface 12Bs thereof is located on the center O. The outputs of the green and red light receiving elements 12G, 12R also display oblique incidence angle characteristics independent of the incidence angle in the longitudinal direction β since the light receiving surfaces 12Gs, 12Rs are annular about the center O. Viewed differently, the light receiving elements can be seen symmetrical with respect to horizontal and vertical axes passing the center O. Since the oblique incidence angle dependencies in the longitudinal direction β caused by the respective parts symmetrical with respect to those axes act to cancel each other, the outputs of the respective light receiving elements display oblique incidence angle characteristics independent of the incidence angle in the longitudinal direction β. The outputs of the green and red light receiving elements 12G, 12R remain dependent on the incidence angle in the longitudinal direction β for the aforementioned small areas. However, since consideration is made to minimize these small areas, the remaining oblique incidence angle dependencies can be made negligible.

Further, since the light receiving elements 12Gs, 12Rs of the green and red light receiving elements 12G, 12R are laterally symmetrical with respect to the axis, the oblique incidence angle dependency in the longitudinal direction β due to the small areas is not caused.

The output signals of the blue, green and red light receiving elements 12B, 12G, 12R are logarithmically amplified by the logarithmic amplifiers 13B, 13G and 13R. These logarithmically amplified signals are fed to the calculator 14, where the ratio of the light components in the wavelength ranges of the respective colors is calculated. Thereafter, the analysis result obtained by using the ratio of the light components in the wavelength ranges of the respective colors is displayed in the display device 15. Specifically, by the colorimeter 11 for photography, the analysis result hardly dependent on the incidence angle in the longitudinal direction β is displayed in the display device 15.

Figure 6A:
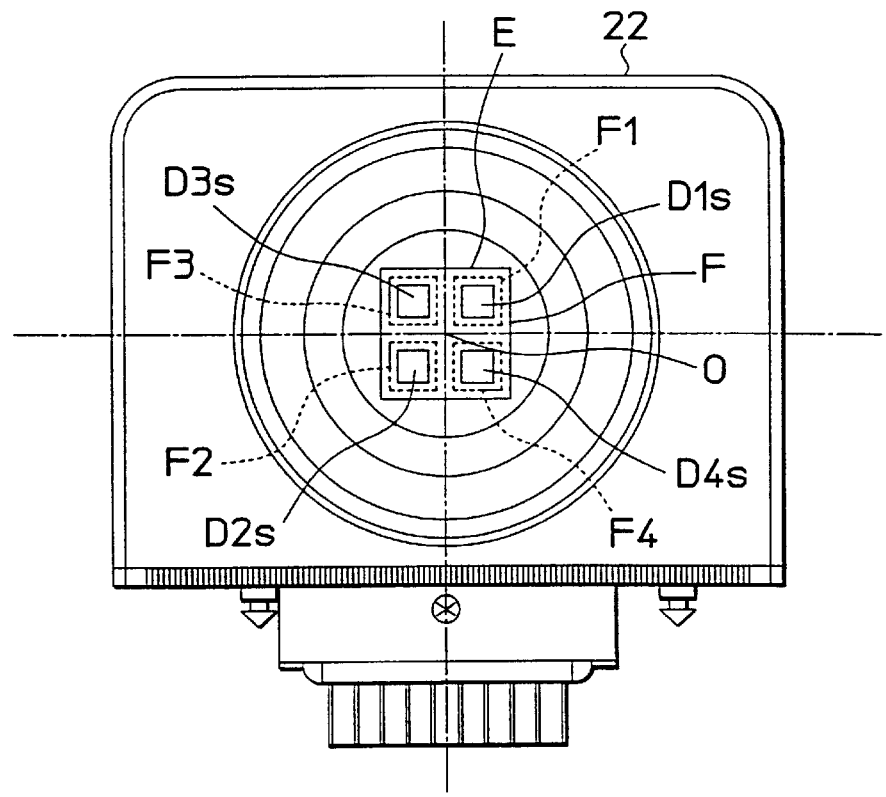
FIG. 6A is a front view of a light receiving section according to a third embodiment of the invention.
Figure 6B:
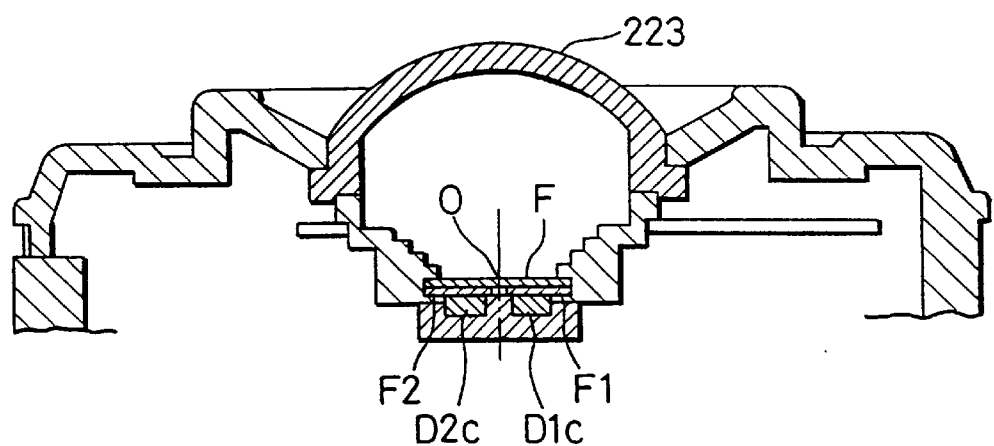
FIG. 6B is a cross sectional view of the light receiving section according of FIG. 6A.
Figure 7A:
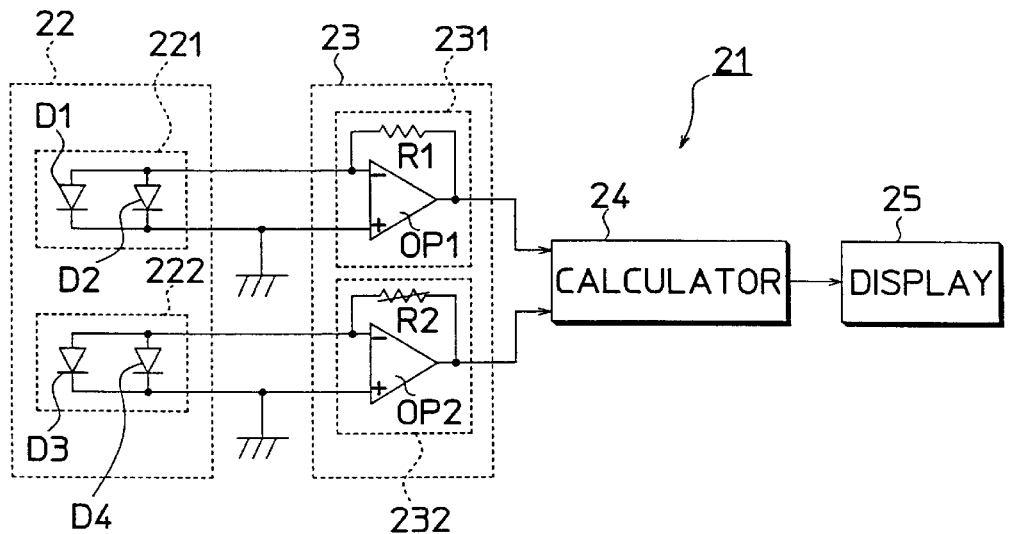
FIG. 7A is a diagram showing a circuit construction of a photometric device according to the third embodiment.
Figure 7B:
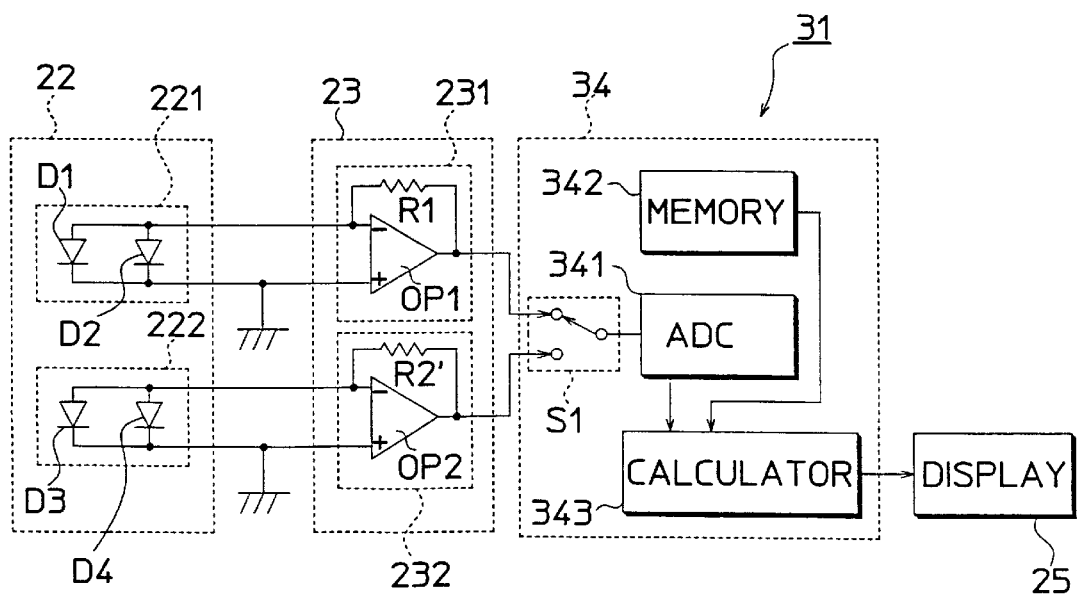
FIG. 7B is a diagram showing another circuit construction of the photometric device according to the third embodiment.

A photometric device adopting a light receiving section according to a third embodiment of the invention is described with reference to FIGS. 6A and 7. FIG. 6A is a front view of the light receiving section 22 detachably mountable on an illuminometer 21 as a photometric device, and FIG. 6B is a sectional view of the light receiving section 22. FIG. 7A is a circuit construction diagram of the illuminometer 21, and FIG. 7B is a diagram showing another circuit construction of the illuminancemeter 21.

As shown in FIG. 7A, the illuminancemeter 21 comprises a light receiving section 22 including a main light receiving element unit 221 and an auxiliary light receiving element unit 222, an amplifying unit 23 for amplifying the respective signals obtained by the light receiving section 22, a calculator 24 for calculating a sum or difference of the respective signals amplified by the amplifying unit 23, and a display device 25 for displaying the sum or difference calculated by the calculator 24 as a measurement value.

As shown in FIG. 6A, the light receiving section 22 is provided at its lower side with a connection terminal connected with the output terminals of the main and auxiliary light receiving element units 221, 222, and is detachably mountable on an unillustrated photometric device main body. A light receiving area E of the light receiving section 22 is divided into four quadrants. Light receiving surfaces D1s, D2s of the main light receiving element unit 221 are arranged in the first and third quadrants of the light receiving area E which are symmetrical with respect to an optical axis passing a center O. Further, light receiving surfaces D3s, D4s of the auxiliary light receiving element unit 222 are arranged in the second and fourth quadrants of the light receiving area E which are symmetrical with respect to the same optical axis.

The main light receiving element unit 221 has a characteristics approximate to the CIE standard observer relative luminous sensitivity characteristics V(λ), and receives a light illuminating an object to obtain an electrical signal corresponding to an amount of the received light. As shown in FIG. 7A, the main light receiving element unit 221 includes light receiving elements D1, D2, which respectively have the aforementioned light receiving surfaces D1s, D2s. Further, as shown in FIG. 6B, amber colored filters F1, F2 are formed on the light receiving surfaces D1s, D2s, respectively. As shown in FIG. 7A, the light receiving elements D1, D2 are connected in parallel with each other, with the cathodes thereof grounded and the anodes thereof connected with an inversion input terminal of an amplifier 231. This connection realizes the cancellation of oblique incidence angle dependencies in the longitudinal direction β caused by the light receiving surfaces D1s, D2s arranged distanced from the center O.

The auxiliary light receiving element unit 222 is adapted to correct the spectral sensitivity of the output of the main light receiving element unit 222 having a characteristics approximate to the CIE standard observer relative luminous sensitivity characteristics V(λ), and receives light components in specified wavelength ranges from the illumination light for the object to obtain an electrical signal corresponding to the light amount of the received light components. As shown in FIG. 7A, the auxiliary light receiving element unit 222 includes light receiving elements D3, D4, which respectively have the aforementioned light receiving surfaces D3s, D4s. Blue filters F3, F4 are formed on the light receiving surfaces D3s, D4s. As shown in FIG. 7A, the light receiving elements D3, D4 are connected in parallel with each other, with the cathodes thereof grounded and the anodes thereof connected with an inversion input terminal of an amplifier 232. This connection realizes the cancellation of oblique incidence angle dependencies in the longitudinal direction β caused by the light receiving surfaces D3s, D4s arranged distanced from the center O.

Further, as shown in FIG. 6B, a cyan filter F is formed on the light receiving area E of the light receiving section 22. Further, a light receiving sphere 223 having a semispherical diffusion surface for ensuring an oblique incidence angle characteristics (the latitudinal direction α) is so mounted as to cover the filter F.

The amplifying unit 23 includes the amplifier 231 for amplifying the output signal of the main light receiving element unit 221 and the amplifier 232 for amplifying the output signal of the auxiliary light receiving element unit 222. The amplifier 231 includes a feedback resistor R1 having a constant resistance value and an inversion amplifier OP1 having a grounded non-inversion input terminal. The amplifier 232 includes a feedback resistor R2 having a variable resistance value and an inversion amplifier OP2 having a grounded non-inversion input terminal. The inversion amplifiers OP1, OP2 have amplification factors which are ratios of the impedances of the feedback resistors R1, R2 to those of the main and auxiliary light receiving element units 221, 222, respectively. The feedback resistor R2 adjusts the amplification factor of the inversion amplifier OP2 to a specified level by making its resistance value variable, and is used to adjust a weight to the output signal of the auxiliary light receiving element unit 222. The adjustment of the resistance value of this feedback resistor R2 is made during the manufacturing of the illuminancemeter 21.

Relationships between the respective filters and the spectral characteristics are described with reference to FIG. 8 which is a graph of degrees of relative response in relation to wavelengths. In FIG. 8, the characteristics H is the CIE standard observer relative luminous sensitivity characteristics, and the characteristics I is each of the spectral sensitivity characteristics of the light receiving elements D1, D2 multiplied by the spectral transmission factors of the amber filters F1, F2 and the cyan filter F and the light receiving sphere 223. The characteristics J is each of the spectral sensitivity characteristics of the light receiving elements D3, D4 multiplied by the spectral transmission factors of the blue filters F3, F4 and the cyan filter F and the light receiving sphere 223. The characteristics J approximates to a difference between the characteristics H and I. Accordingly, the output of the amplifier 231 deviating from the CIE standard observer relative luminous sensitivity characteristics can be corrected by adding or subtracting the output of the amplifier 231 and the output of the amplifier 232. In the example of FIG. 8, values are higher in the characteristics H than in the characteristics I in a range corresponding to the characteristics J. Thus, an illuminance measurement value having the characteristics H and in accordance with the CIE standard observer relative luminous sensitivity characteristics can be obtained by subtracting the output value of the amplifier 232 corresponding to the characteristics J from the output value of the main light receiving element unit 221 having the characteristics I. If the values are lower in the characteristics I than in the characteristics H, the output value of the amplifier 232 is added to the output value of the main light receiving element unit 221.

Next, an operation of the light receiving section 22 is described. The light illuminating the object to be measured by the illuminancemeter is received by the light receiving surface of the light receiving element D1 via the filters F, F1 and obtained as an electrical signal by the light receiving element D1. Likewise, the illumination light for the object is received by the light receiving surface of the light receiving element D2 via the filters F, F2 and obtained as an electrical signal by the light receiving element D2; is received by the light receiving surface of the light receiving element D3 via the filters F, F3 and obtained as an electrical signal by the light receiving element D3; and is received by the light receiving surface of the light receiving element D4 via the filters F, F4 and obtained as an electrical signal by the light receiving element D4.

The electrical signals obtained by the light receiving elements D1, D2 are independent of the oblique incidence angle in the longitudinal direction β by being inputted to the amplifier 231 while being superimposed. This is because the oblique incidence angle dependency in the longitudinal direction β caused by the light receiving surface D1s of the light receiving element D1 distanced from the center O is canceled by the oblique incidence angle dependency in the longitudinal direction β caused by the light receiving surface D2s of the light receiving element D2 which is symmetrical to the light receiving surface D1s with respect to the center O and is distanced from the center O. Likewise, the electrical signals obtained by the light receiving elements D3, D4 are independent of the incidence angle in the longitudinal direction β by being inputted to the amplifier 232 while being superimposed. This is because the oblique incidence angle dependency in the longitudinal direction β caused by the light receiving surface D3s of the light receiving element D3 distanced from the center O is canceled by the oblique incidence angle dependency in the longitudinal direction β caused by the light receiving surface D4s of the light receiving element D4 which is symmetrical to the light receiving surface D3s with respect to the center O and is distanced from the center O.

The output signals of the main and auxiliary light receiving element units 221, 222 displaying the incidence angle characteristics independent of the incidence angle in the longitudinal direction β are amplified by the amplifiers 231, 232, respectively. These amplified signals are sent to the calculator 24, where correction is applied by adding or subtracting the amplified signals. Thereafter, a calculated value is displayed as a measurement value by the display device 25. In other words, by the illuminancemeter 21, the measurement result which is independent of the incidence angle in the longitudinal direction β and is so corrected as to agree with the CIE standard observer relative luminous sensitivity characteristics V(λ) is displayed in the display device 25.

Although the feedback resistor R2 having a variable resistance value is used in the amplifier 232 in FIG. 7A, the feedback resistor used therein is not limited to this. A feedback resistor R2' having a constant resistance value may be used as shown in FIG. 7B which is another construction diagram. In this case, instead of the calculator 24, there may be used a calculator 34 provided with a switch S1 for selectively switching the connection thereof with the amplifiers 231, 232, an analog-to-digital converter (ADC) 341 for converting the output signal obtained by the switching of the switch S1 into a digital value, a memory 342 such as an EEPROM for storing a weight factor to the output of the amplifier 232, and a calculator 343 for performing calculation using the output values of the amplifiers 231, 232 and the weight factor. The weight is so set as to approximate to the characteristics J of FIG. 8 during the manufacturing. The calculator 343 specifically multiplies the output value of the amplifier 232 by the weight factor read from the memory 342 and calculates a sum or difference of the value obtained by the multiplication and the output value of the amplifier 231.

In FIG. 7A, the light receiving section 22 is constructed such that the spectral sensitivity of the main light receiving element unit 221 approximate to the CIE standard observer relative luminous sensitivity characteristics V(λ) is corrected using the auxiliary light receiving element unit 222 including a pair of light receiving elements D3, D4. However, the construction of the light receiving section 22 is not necessarily limited to the above. In the case that correction needs to be made for a plurality of wavelength ranges, a plurality of auxiliary light receiving element units may be so provided as to be symmetrical with respect to the center O. In other words, regardless of the main or auxiliary light receiving element unit, it is sufficient that a plurality of light receiving element units include light receiving elements having light receiving surfaces which are symmetrical with respect to an axis passing the center of a light receiving area.

In a light source such as an incandescent lamp or fluorescent lamp, or a light source meter (incident light type) for measuring the color of a light source such as a CRT, its light receiving section is provided with light receiving elements having spectral sensitivities x(λ), y(λ), z(λ) specified by the CIE standard observer. Accordingly, all light receiving elements cannot physically be arranged in the center of the light receiving section exactly as in the aforementioned colormeter for photography. Therefore, the oblique incidence angle characteristics could not conventionally approximate to a cosine characteristics.

Accordingly, a measurement value of Y-value could not be referred to as "illuminance" since the amount of incident light in an oblique direction could not properly be evaluated. Thus, the Y-value is displayed without any unit by being referred to as "illuminance equivalent". However, according to the present invention, the oblique incidence angle characteristics can approximate to a cosine characteristics. Therefore, the Y-value can be displayed as "illuminance" (i.e., unit can be affixed thereto), thereby improving the user friendliness.

As described above, there can be realized a light receiving device having an oblique incidence angle characteristics independent of the incidence angle in the longitudinal direction. As a result, without considering the oblique incidence angle characteristics in the longitudinal direction, a degree of allowability or freedom in designing the diffusing member having a desired oblique incidence angle characteristics in the latitudinal direction can be improved.

Also, the oblique incidence angle characteristics to the output of the light receiving device can become independent of the incidence angle in the longitudinal direction.

Further, an accurate measurement data independent of the incidence angle in the longitudinal direction can be outputted. This absolutely eliminates the need for considering the orientation of the photometric device during a measurement, thereby relaxing the restrictions during a use. Further, a diffusing member having a semispherical surface can be used in a colorimeter for photography.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A light receiving section for use in a photometric device, comprising:
    a diffusing member which has a spherical diffusing surface to diffuse incident light to provide a predetermined oblique incidence angle characteristics; and
    a plurality of light receiving units which each receive light diffused by the diffusing member, each of the light receiving units including a light receiving surface that is a symmetrical form with respect to an optical axis of the light receiving section.

2. A light receiving section for use in a photometric device according to claim 1, wherein each of the light receiving units is provided with a plurality of light receiving elements which each include a light receiving surface, respective light receiving surfaces of the plurality of light receiving elements having the same kind and the same shape, and being arranged symmetrically to one another with respect to the optical axis of the light receiving section.

3. A light receiving section for use in a photometric device according to claim 2, wherein the plurality of light receiving units include three light receiving units, a first light receiving unit being sensitive to a blue wavelength range, a second light receiving unit being sensitive to a green wavelength range, and a third light receiving unit being sensitive to a red wavelength range.

4. A light receiving section for use in a photometric device according to claim 2, wherein the diffusing member provides an oblique incidence angle characteristics of cardioid type.

5. A light receiving section for use in a photometric device according to claim 1, wherein each of the light receiving surfaces of the plurality of light receiving units is a form of a circle having a center of the optical axis of the light receiving section.

6. A light receiving section for use in a photometric device according to claim 5, wherein the plurality of light receiving units include three light receiving units, a first light receiving unit being sensitive to a blue wavelength range, a second light receiving unit being sensitive to a green wavelength range, and a third light receiving unit being sensitive to a red wavelength range.

7. A light receiving section for use in a photometric device according to claim 5, wherein the diffusing member provides an oblique incidence angle characteristics of cardioid type.

8. A photometric device comprising:
    a light receiving section including:
        a diffusing member which has a spherical diffusing surface to diffuse incident light to provide a predetermined oblique incidence angle characteristics; and
        a plurality of light receiving units which each receive light diffused by the diffusing member, each of the light receiving units including a light receiving surface that is a symmetrical form with respect to an optical axis of the light receiving section;
    a calculator which calculates a measurement value based on respective outputs of the plurality of light receiving units; and
    an output section which outputs the measurement value calculated by the calculator.

9. A photometric device according to claim 8, wherein each of the light receiving units is provided with a plurality of light receiving elements which each include a light receiving surface, respective light receiving surfaces of the plurality of light receiving elements having the same kind and the same shape, and being arranged symmetrically to one another with respect to the optical axis of the light receiving section.

10. A photometric device according to claim 9, wherein the plurality of light receiving units include three light receiving units, a first light receiving unit being sensitive to a blue wavelength range, a second light receiving unit being sensitive to a green wavelength range, and a third light receiving unit being sensitive to a red wavelength range.

11. A photometric device according to claim 9, wherein the diffusing member provides an oblique incidence angle characteristics of cardioid type.

12. A photometric device according to claim 8, wherein each of the light receiving surfaces of the plurality of light receiving units is a form of a circle having a center of the optical axis of the light receiving section.

13. A photometric device according to claim 12, wherein the plurality of light receiving units include three light receiving units, a first light receiving unit being sensitive to a blue wavelength range, a second light receiving unit being sensitive to a green wavelength range, and a third light receiving unit being sensitive to a red wavelength range.

14. A photometric device according to claim 12, wherein the diffusing member provides an oblique incidence angle characteristics of cardioid type.

15. A photometric device according to claim 8, wherein:
    the plurality of light receiving units includes a first light receiving unit having a spectral sensitivity characteristics near to the spectral sensitivity characteristics of the CIE standard observer, and a second light receiving unit having a spectral sensitivity characteristics near to a difference between the spectral sensitivity characteristics of the first light receiving unit and the spectral sensitivity characteristics of the CIE standard observer; and
    the calculator corrects an output of the first light receiving unit by adding or subtracting an output of the second light receiving unit to or from the output of the first light receiving unit.

16. A photometric device according to claim 15, wherein the first light receiving unit includes a first filter having a predetermined spectral transmittance, and the second light receiving unit includes a second filter having a spectral transmittance different from the spectral transmittance of the first light receiving unit.

17. A colormeter for photography, comprising:
    a light receiving section including:
        a diffusing member which has a spherical diffusing surface to diffuse incident light to provide a predetermined oblique incidence angle characteristics; and
        three light receiving units which are sensitive to a blue wavelength range, a green wavelength range, and a red wavelength range, respectively, and each receive light diffused by the diffusing member, and each include two light receiving elements arranged symmetrically to each other with respect to the optical axis of the light receiving section;
    a calculator which calculates a component ratio of blue, green, and red wavelength ranges based on a combined output of the two light receiving elements of each of the three light receiving units; and
    a display section which displays a measurement result based on the component ratio calculated by the calculator.

18. A colormeter for photography according to claim 17, wherein respective light receiving surfaces of the light receiving elements have the same kind and the same shape.

19. A colormeter for photography according to claim 17, wherein the diffusing member provides an oblique incidence angle characteristics of cardioid type.

20. A colormeter for photography, comprising:

a light receiving section including:
   a diffusing member which has a spherical diffusing surface to diffuse incident light to provide a predetermined oblique incidence angle characteristics; and
   three light receiving units which are sensitive to a blue wavelength range, a green wavelength range, and a red wavelength range, respectively, and each receive light diffused by the diffusing member, and each include a light receiving surface that is a form of a circle having a center of an optical axis of the light receiving section;

a calculator which calculates a component ratio of blue, green, and red wavelength ranges based on respective outputs of the three light receiving units; and a display section which displays a measurement result based on a component ratio calculated by the calculator.

21. A colormeter for photography according to claim 20, wherein the diffusing member provides an oblique incidence angle characteristics of cardioid type.

22. A colormeter for photography according to claim 20, wherein the light receiving surfaces of the three light receiving units have the same area.

23. An illuminancemeter comprising:

a light receiving section including:
   a diffusing member which has a spherical diffusing surface to diffuse incident light to provide a predetermined oblique incidence angle characteristics; and
   a first light receiving unit and a second light receiving unit which each receive light diffused by the diffusing member,
   the first light receiving unit including two light receiving elements arranged symmetrically to each other with respect to an optical axis of the light receiving section and having a spectral sensitivity characteristics near to the spectral sensitivity characteristics of the CIE standard observer, and
   the second light receiving unit including two light receiving elements arranged symmetrically to each other with respect to the optical axis of the light receiving section and having a spectral sensitivity characteristics near to a difference between the spectral sensitivity characteristics of the first light receiving unit and the spectral sensitivity characteristics of the CIE standard observer;

a calculator which corrects a combined output of the two light receiving elements of the first light receiving unit by adding or subtracting a combined output of the two light receiving elements of the second light receiving unit to or from the combined output of the two light receiving elements of the first light receiving unit, and calculates an illuminance based on a corrected output; and a display section which displays a calculated illuminance.

24. An illuminancemeter according to claim 23, wherein the first light receiving unit includes a first filter having a predetermined spectral transmittance, and the second light receiving unit includes a second filter having a spectral transmittance different from the spectral transmittance of the first light receiving unit.

* * * * *